H. L. DEPOY.
BAND SAW GUIDE.
APPLICATION FILED OCT. 26, 1908.
934,893.
Patented Sept. 21, 1909.
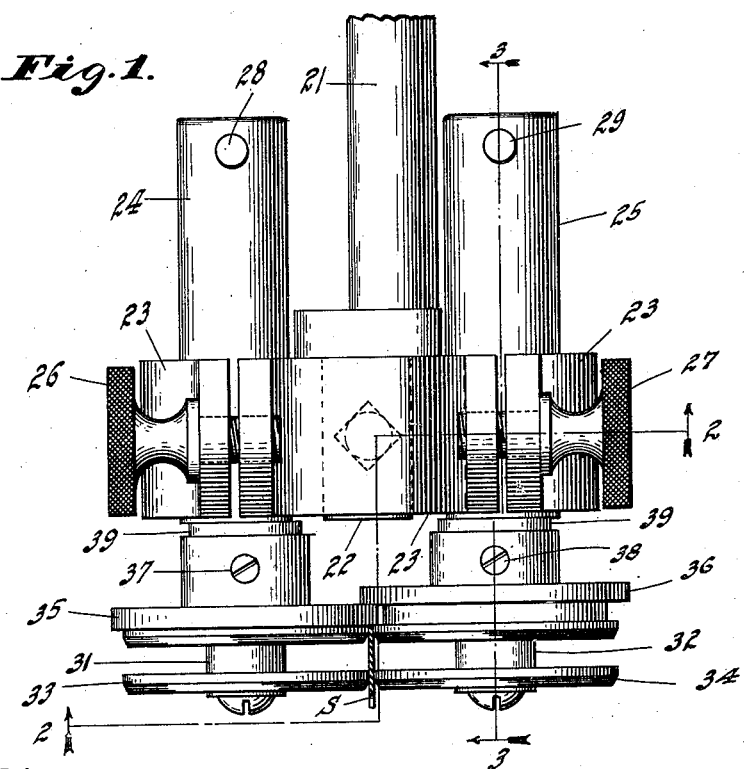
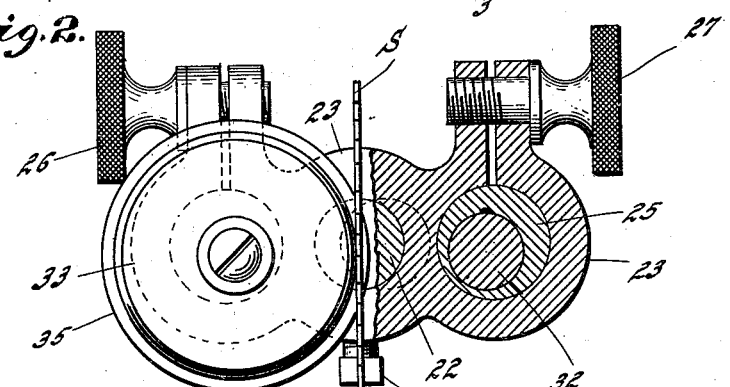
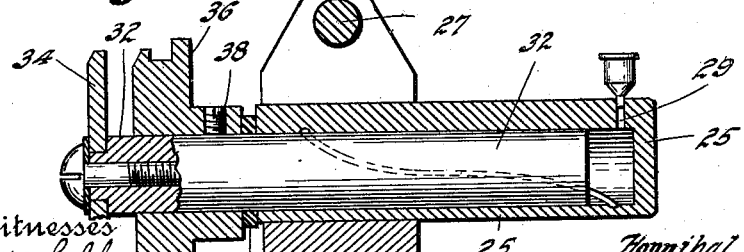
Witnesses
Frank A. Fahle
Thomas W. McMean
Inventor
Hannibal L. Depoy,
By Bradford V. Hood,
Attorneys

UNITED STATES PATENT OFFICE.

HANNIBAL L. DEPOY, OF MUNCIE, INDIANA, ASSIGNOR TO HENRY GRAFF, JR., OF WATERLOO, IOWA.

BAND-SAW GUIDE.

934,893.

Specification of Letters Patent. Patented Sept. 21, 1909.

Application filed October 26, 1908. Serial No. 459,607.

*To all whom it may concern:*

Be it known that I, HANNIBAL L. DEPOY, a citizen of the United States, residing at Muncie, in the county of Delaware and State of Indiana, have invented certain new and useful Improvements in Band-Saw Guides, of which the following is a specification.

My present invention relates to that class of devices by means of which a band saw is accurately guided to its work.

Said invention principally consists in means for accurately adjusting the guide members to the width, thickness and position of the saw, and holding the same in adjusted position, and in accurate relation to each other.

It further consists in certain details of construction and arrangement, all as will be hereinafter more particularly described and claimed.

Referring to the accompanying drawings, which are made a part hereof, and on which similar reference characters indicate similar parts, Figure 1 is a plan view of a band saw guide embodying the features of my present invention; Fig. 2 a view of the same, partially in front elevation and partially in transverse section, as seen when looking in the direction indicated by the arrows from the dotted line 2 2 in Fig. 1, and Fig. 3 a longitudinal sectional view as seen when looking in the direction indicated by the arrows from the dotted line 3 3 in Figs. 1 and 2.

This guide is supported upon a stud-shaft 21 which is carried from the frame of the band sawing machine. Said stud-shaft has an eccentrically-positioned wrist 22 upon which the frame 23 of the saw guide is immediately mounted; so that, by revolving the stud-shaft 21, the position of the guide as a whole may be adjusted in respect to said shaft. When the guide has been adjusted to the proper relative position to said stud-shaft, it may firmly be secured in place by means of a set screw 23'. Within suitable bearings in the body 23 I place two cylindrical eccentric bearings 24 and 25. The chambers of these bearings are eccentric to the exterior surfaces, as is best shown in Fig. 3, and they are capable of being revolved in their bearings in the main frame part 23. The interior surfaces of said chambers are spirally grooved throughout a considerable portion of their length as is best shown (in part in dotted lines) in Fig. 3 so that the lubricant (which may be introduced through suitable openings 28 and 29) will be caused to travel forward along the shafts. The bearings for the cylindrical bearings 24 and 25 are split, as shown in Figs. 1 and 3, and are provided with clamping screws 26 and 27 by means of which they may be clamped tightly onto said bearings.

The guide-wheel shafts 31 and 32 rest in the cylindrical eccentric bearings, and said shafts and the wheels carried thereby may be adjusted toward and from each other by revolving said bearings 24 and 25. There are two sets of bearing wheels for the saw mounted on these shafts. The set of wheels upon the extreme ends of the shaft consists of plain disks 33 and 34, the edges of which, in use, are adjusted to bear against the sides of the saw blade. The rear set of wheels 35 and 36 have corresponding bearing surfaces which bear against the sides of the saw blade at its rear edge, and the wheel 35 has also a member which extends past the saw blade and furnishes support for its rear edge, said member or portion extending into a groove in the face of wheel 36, so that the faces of said two wheels interengage, and are thus held in line with each other. The distance between the set of wheels 33—34, and the set of wheels 35—36 is capable of adjustment to suit the width of the blade of saw S, which is to be guided thereby. The hubs of said wheels 35 and 36 have set screws 37 and 38, and when said set screws are loosened said wheels may be slipped longitudinally of the shafts 31 and 32. When the guide is adjusted ready for use, the said wheel hubs, or the anti-friction washers 39, rest against the forward ends of the cylindrical bearings 24 and 25, so that the ends of said bearings receive the thrust due to the pressure of the work on the saw blade.

My improved band saw guide may thus not only be adjusted with great accuracy, but it is of a very simple and durable construction, and produces the least possible friction upon the saw and working parts.

Having thus fully described my said invention, what I claim as new, and desire to secure by Letters Patent, is:—

1. The combination, in a band saw guide, of a frame, eccentric cylindrical bearings, shafts mounted in said bearings, and saw guiding wheels mounted upon said shafts.

2. The combination, in a band saw guide, of a frame, eccentric cylindrical bearings, shafts mounted in said bearings, and two sets of saw-guiding wheels mounted on said shafts, one set being adjustable toward and from the other.

3. The combination, in a band saw guide, of a frame, eccentric cylindrical bearings, shafts mounted in said bearings, and two sets of saw-guiding wheels mounted on said shafts, one set being adjustable toward and from the other, the adjustable set having interengaging formation where they come together whereby they are held in line with each other.

4. The combination, in a band saw guide, of a frame provided with cylindrical slitted bearings, clamping screws for compressing said bearings, eccentric cylindrical bearings, shafts mounted in said bearings, and saw guiding wheels mounted upon said shafts.

5. The combination, in a band saw guide, of a supporting stud shaft having an eccentrically positioned wrist, a frame mounted thereon, eccentric cylindrical bearings mounted in said frame, and saw-guiding wheels mounted on said shafts.

6. The combination, in a band saw guide, of eccentric cylindrical bearings, shafts mounted therein, and two saw guiding wheels mounted on each of said shafts, one of the wheels on each shaft being adjustable toward and from the other, and the adjustable wheels on the two shafts having interengaging surfaces where they come together.

In witness whereof, I, have hereunto set my hand and seal at Muncie, Indiana, this 22nd day of October, A. D. one thousand nine hundred and eight.

HANNIBAL L. DEPOY. [L. S.]

Witnesses:
J. FRANK MANN,
D. C. SPENCER.